Sept. 20, 1938.   T. R. WATTS ET AL   2,130,865
PORTABLE INSULATION TESTING EQUIPMENT
Filed May 19, 1936   2 Sheets-Sheet 1

WITNESSES:

INVENTORS
James H. Frakes &
Thomas R. Watts
BY
ATTORNEY

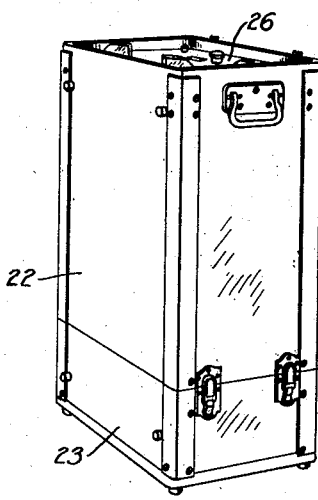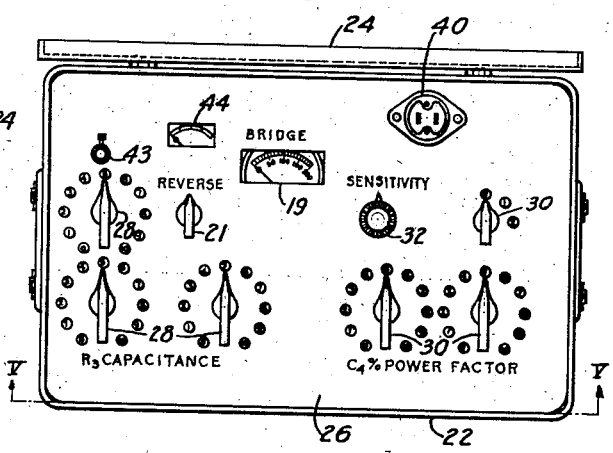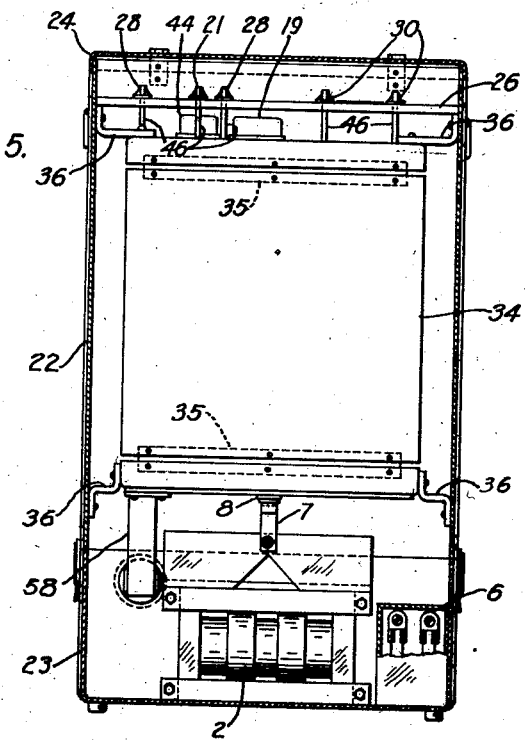

Patented Sept. 20, 1938

2,130,865

UNITED STATES PATENT OFFICE 2,130,865

PORTABLE INSULATION TESTING EQUIPMENT

Thomas R. Watts, Forest Hills, and James H. Frakes, Wilkinsburg, Pa., assignors to Westinghouse Electric & Manufacturing Company, East Pittsburgh, Pa., a corporation of Pennsylvania Application May 19, 1936, Serial No. 80,560

7 Claims. (Cl. 175—183)

The present invention relates to testing equipment for determining the insulation qualities of high-tension bushings, transformer coils and the like, and more particularly to a testing equipment which is readily portable and capable of giving a reading of the capacitance and power-factor of a test specimen in the field, as distinguished from removing it from the apparatus with which it is associated and taking it to the laboratory for testing.

For some years, equipment for testing the insulation qualities of bushings in the field has been available but it has been quite complicated in character and although capable of being transported by truck to the field it was not as readily portable, or capable of as easy manipulation as would be desirable.

It is an object of the present invention, therefore, to provide a testing set for insulation and dielectrics which is more readily portable than equipment now available but which sacrifices none of the accuracy or practical range of measurement heretofore obtainable.

Other objects will appear from the following specification taken in conjunction with the accompanying drawings, wherein:

Fig. 3 is a perspective view of the encased testing equipment;

Fig. 4 is a plan view of the structure shown in Fig. 3; and

Fig. 5 is a view showing the interior of the testing equipment with the casing shown in vertical section on line V—V of Fig. 4.

Figure 1:
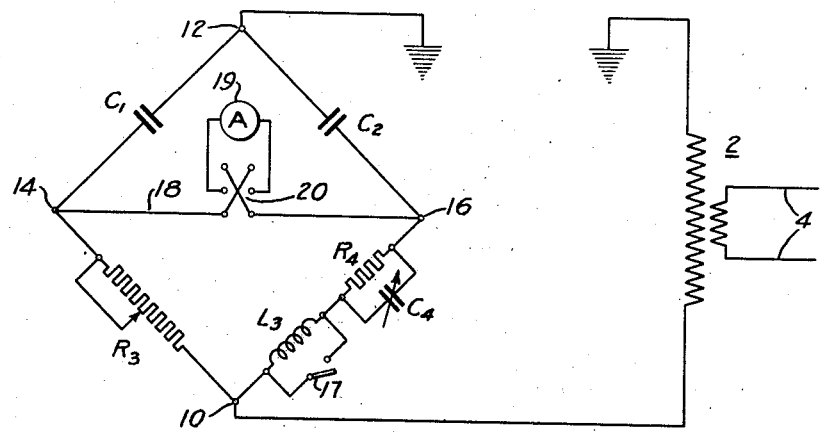
Figure 1 is a diagrammatic sketch of the circuit arrangement used in the present invention.

Referring to the diagrammatic showing in Fig. 1, the test circuit comprises a step-up transformer 2 the low tension winding of which is energized from a suitable alternating current source 4, such as 115 volts. The high tension winding, for the test potential, which may be of the order of 10 kv., has one side thereof grounded and the other connected to the junction 10 of a bridge circuit, the opposite junction 12 of which is grounded. The transformer potentials may be varied, of course, to obtain a desired test voltage.

The insulation to be tested, here indicated as a condenser $C_1$, and a standard condenser $C_2$ are respectively connected in adjacent arms of the bridge between the grounded junction 12 and the junctions 14 and 16. Of the remaining two bridge arms, one contains a variable resistor $R_3$, and the other a fixed resistor $R_4$ shunted by a variable condenser $C_4$, both in series with a reactor $L_3$. A switch 17 in parallel with $L_3$ controls its effectiveness.

The bridge balance conductor 18 is connected to an indicating instrument 19 through a reversing switch 20.

The bridge above described is of the so-called Schering type, but is inverted with respect to the usual Schering connections, and includes the inductance $L_3$. The usual Schering connections are shown in Patent 1,166,159, issued December 28, 1915, to Phillips Thomas and assigned to the Westinghouse Electric & Manufacturing Company. In the so-called Schering bridge the junction 10, of the present invention, would be at ground potential and the junction 12 at test potential. These potentials are inverted, as shown in Fig. 1, because the test specimen $C_1$ usually has one side grounded when in service, and because of such inversion it is unnecessary to break such ground connection, that is, the specimen may be tested in its service position.

Referring to Figs. 3, 4 and 5, the testing apparatus is housed in a portable metallic casing 22 having a removable lower portion 23, a hinged cover 24 and a switching panel 26.

On the panel 26, the three adjusting pointers 28 are used to vary the resistance of $R_3$ (see Fig. 1) and indicate the effective value of such resistance. The three pointers 30 vary and indicate the effective capacitance of $C_4$. The indicating instrument 19 for indicating the bridge balance is visible through, but not connected with, the panel 26, and its sensitivity is controlled by knob 32 as hereinafter described.

An aluminum shell 34 having top and bottom covers insulated therefrom, as by strips 35 secured inside the shell, is secured within the casing 22 by insulating brackets 36, the main body of the shell 34 constituting, with the metallic walls of the casing 22, the standard condenser $C_2$ of Fig. 1.

The bottom section 23 of the casing 22 contains the transformer 2, a suitable fuse and terminal block 6 to which may be removably connected flexible conductors (not shown) extending upwardly through the casing 22 for connection with an outlet socket 40 on the panel 26 to receive a plug connected to the low-potential supply 4 to energize the low potential winding of the transformer. One side of the high-tension transformer winding is electrically connected to a spring strip 7 secured at one end to the transformer and resiliently engaging an insulated terminal post 8, mounted in the bottom cover of shell 34, when the casing sections 22 and 23 are secured together.

Figure 2:
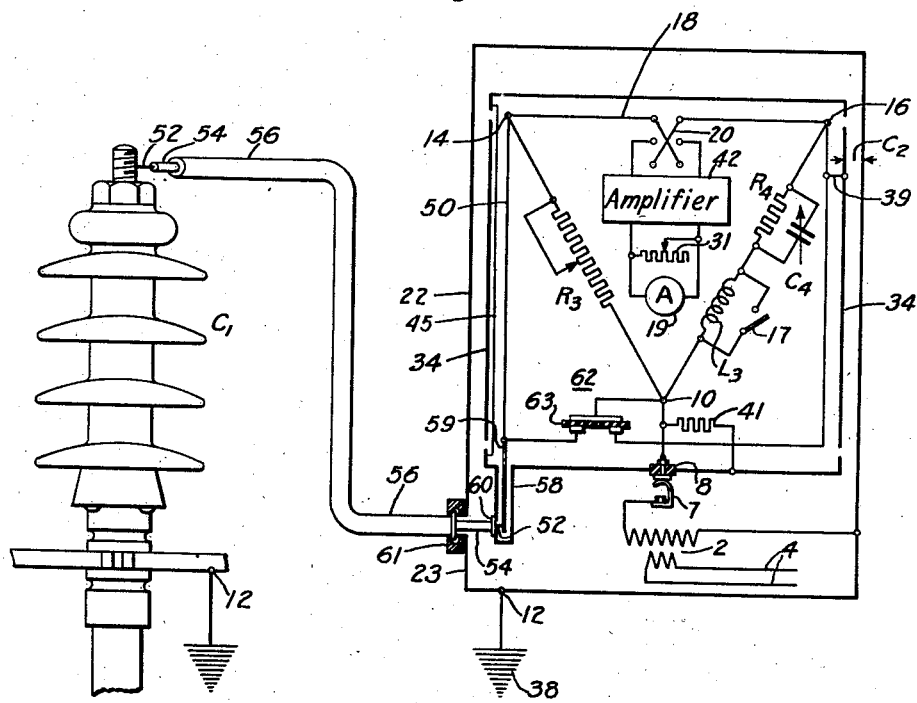
Fig. 2 is a schematic showing of the circuit of Fig. 1 in conjunction with other parts of the complete testing equipment.

The electrical connections within the casing 22 are shown more clearly in Fig. 2, wherein elements corresponding to those shown in the other figures have corresponding reference numerals or letters.

Referring to Fig. 2, the casing 22 is grounded, as at 38, corresponding to the ground at bridge terminal 12 in Fig. 1, and one side of the high-tension winding of transformer 2 is grounded to the casing. The other side of such winding is connected to strip 7 which engages the bottom of terminal 8, secured to but insulated from the bottom of shell 34, when the two parts 22 and 23 of the casing are together. The junction 10 of the bridge is electrically connected to such terminal 8 within the shell 34, and the junction 16 is connected to the body, or central portion, of the shell by a conductor 39. As above indicated, the body of the shell and the metal casing 22 constitute the fixed condenser $C_2$ of Fig. 1.

A resistor 41, connected between the bottom of shell 34 and the conductor extending to bridge junction 10, is of a value to compensate for the potential drop of the bridge impedance devices. The bottom of the shell and the top section are connected by a conductor 45 and constitute guard electrodes at the same potential as the bridge junction 14, by reason of resistor 41.

The indicating instrument 19, which may be a microammeter, is mounted on the top cover of the shell 34, as shown in Fig. 5, and is preferably provided with an adjustable shunt resistor 31, controlled by knob 32 on the panel 26 (Fig. 4), to vary its sensitvity. A vacuum tube amplifier 42 controls the energization of the instrument 19; its input being connected to the reversing switch 20 which is controlled by a handle 21 on the switching panel 26.

The amplifier 42 may be of any desired type but preferably includes a filter which will pass only the test frequency. The tube circuits may be energized by a separate battery and controlled by a switch 43 on the instrument panel 26. A voltmeter 44 for indicating the energization of the tube filaments, may be mounted adjacent to the microammeter 19 to be visible through an opening in the panel, as shown in Figs. 4 and 5.

All of the bridge equipment, with the exception of the indicating instruments and $C_1$, is mounted within the aluminum shell 34 which effectively shields it. Fiber rods 46 (Fig. 5) connect the various handles on the panel with the respective bridge control elements, and the indicating instruments are mounted on top of the shell 34 out of contact with the panel. The shell 34 being substantially at test potential, this type of construction is desirable for the protection of the operator.

The bridge junction 14 is connected by a conductor 50, and an insulated test lead 52, extending through the bottom of shell 34 and through the rear of the casing section 23 (as viewed in Fig. 3), to the ungrounded terminal of the test specimen $C_1$, in this case a bushing of the condenser type. The lead 52 is relatively long to permit such connection without removing the bushing from its installation.

A conducting shield 54 encases the lead 52, from within the casing section 23 to the bushing, and the inner end of the shield is electrically connected to the bottom section or guard electrode of shell 34. It is desirable that the shield and lead 52 be at the same potential, to eliminate losses between the bridge and shield, and accordingly the resistor 41 is of a value to balance the drop through the bridge circuit to the junction 14.

A guard 56 may encase the shield 54 and lead 52 outside the casing 22. Guard 56 is grounded to the casing 22 and is effective to eliminate the minor electrostatic charge which would ordinarily develop on the insulation surrounding the shield 54. Such charge, or the discharge thereof, has no appreciable effect on the operation of the equipment, but the guard may be provided to avoid a possibly undesirable psychological effect on the operator.

It is to be understood that the shield 54 and guard 56 are insulated from each other and from the lead 52, and the guard 56 is covered with insulation. The showing of these elements is merely diagrammatic, cables of such construction being readily available.

The connection of the bridge-end of the lead 52 is necessarily detachable to permit removal of the casing section 23. This is accomplished, as indicated in Fig. 2, by a tubular portion 58 depending from the bottom of shell 34, having an aperture in line with a larger opening in the casing portion 23. The member 58 encloses a relatively stiff conductor 59 exposed through said aperture and connected by conductor 50 to the bridge junction 14. The bridge-end of the test cable is provided with a resilient collar 60 connected to the shield 54, and a flange connected to the end of guard 56. The collar and flange are spaced to engage respectively the member 58 and the casing 23 around the respective apertures therein. The test lead 52 projects beyond the collar 60 for engagement with the conductor terminal 59. Accordingly, by a thrust movement the test lead with its shield and guard may be properly connected to the test set, and may be detachably secured in such position by a clamping nut 61 which pulls the flange of guard 56 against a threaded nipple surrounding the opening in casing portion 23.

If at any time the bushing or other sample under test breaks down or is short circuited, damage might result to the bridge. In order to prevent this, a discharge device 62 may be provided, comprising a strip or sheet of dielectric material 63, such as mica, having on one side an electrode connected to the high potential junction 10 of the bridge, and electrodes on the opposite side connected respectively to the bridge junctions 14 and 16. In the event of a flashover, the dielectric 63 breaks down establishing a low-resistance path shunting the various impedance devices in the lower legs of the bridge. Of course other cut-out or protective devices of this general character may be used if desired.

In operation, with the test lead 52 connected to the specimen, as in Fig. 2, the amplifier 42 energized and the instrument sensitivity resistor 31 at its lowest point of adjustment, the lead from the low-voltage source may be plugged in the socket 40 (Fig. 4). The transformer 2 is thereby energized, and the high-potential test voltage is impressed on the bushing through the bridge circuit. The bridge may then be balanced by adjusting the resistor $R_3$ and condenser $C_4$ to obtain a null reading on microammeter 19, the sensitivity control 31 being operated to maintain the indications of the microammeter within the limits of the scale. By reason of the plurality of dial switches 29 and 30 for $R_3$ and $C_4$, a desired accuracy of reading may be obtained of the values of these quantities required to balance the bridge.

When the bridge is balanced, as indicated by the microammeter 19, the values of $R_3$ and $C_4$, as read from the dials, are measures, respectively, of the capacity of the bushing in microfarads and the power-factor of the bushing. That is, when the bridge is balanced, the following formulae obtain:

$$\frac{C_4}{10} = \cot \theta \qquad (1)$$

and $$C_1 = C_2 \frac{R_4}{R_3} \qquad (2)$$

Cot θ is, for all practical purposes, equal to cos θ, which is the power factor expression, and, in (2), $C_2$ and $R_4$ being constant the capacity of the specimen is readily obtained from the reading of $R_3$. It is assumed that the series capacitance and parallel capacitance of the specimen are equal for all practical purposes.

The proofs of the above formulae and statements are not given here, in the interest of brevity, but are well understood by those skilled in the art.

When the bridge is balanced and the $R_3$ and $C_4$ readings taken, the bridge reversing switch 20 should be thrown, by means of handle 21 (Fig. 4), to reverse the connections to the amplifier, and the bridge rebalanced, if necessary. If the readings are not the same with the switch 20 in both positions, it indicates the existence of interference affecting the microammeter, such as an alternating current magnetic field. If the readings are not the same, the values of $R_3$ and $C_4$ taken in each position of the switch 20 should be averaged to give the true values.

Also, errors due to interference from an electrostatic field, such as from a high voltage line overhead, can be eliminated by averaging the $R_3$ and $C_4$ readings obtained with the low-voltage supply reversed. This may be accomplished merely by rotating the plug in socket 40.

It has been found in practice that electrostatic interference may be of such magnitude that the bridge cannot be balanced. That is, with the $C_4$ dials at zero, a null reading cannot be obtained on the microammeter 19. It is an important aspect of the present invention that this condition may be taken care of by the impedance $L_5$ shunted by switch 17. This impedance is so designed that the value of $C_4$ is increased by such an amount that it will be sufficient to compensate for interference values usually encountered. For example, if it is increased by .3 mfd., which is equivalent to 3% power factor, the value will be sufficiently larger than errors usually encountered to permit the desired compensation. In reading the power factor from the dials of $C_4$, therefore, with switch 17 open, the following formula obtains:

$$P.F. = \frac{C_4 + C_4 \text{ (with 40 reversed)}}{2} - .3 \text{ mfd.} \times 10$$

The $R_3$ values are read as usual.

In accordance with the foregoing, a testing equipment is provided which will read directly power-factors up to 10%. Above this value, it is necessary to revert to a correction chart or curve because the assumption that power factor is equal to the reading of $C_4$ no longer holds with sufficient accuracy. In the great majority of cases, however, the power factor will be below 10% and the reading may be taken directly from the $C_4$ dials.

Further, a testing equipment constructed, as described, has a weight of the order of 100 lbs. and may be readily carried by hand or transported to the field in an ordinary automobile. This renders the use of the testing equipment much more flexible than heretofore possible when trucks had to be used and several men required to move the equipment into position. In spite of the high degree of portability, the accuracy of the test results is not adversely affected and the operation of the set is facilitated by the simplification of the bridge circuit and the provision of the corrective inductance $L_5$.

In addition, the mechanical arrangement of the parts results in a particularly compact design. The instruments and dials are readily viewed from the top of the casing, the section 23 may be readily removed to afford access to the transformer and the bridge equipment, and the fixed condenser plate 34 extending vertically prevents the accumulation of foreign matter between it and the wall of casing 22 which would tend to introduce losses.

Quite obviously, the construction and circuit arrangement shown may be varied without departing from the scope of the invention, and it is desired that no limitations be placed on the invention, except as imposed by the appended claims.

We claim as our invention:

1. A device for measuring insulation qualities of a grounded specimen comprising a metallic casing, a shell of conducting material therein and spaced therefrom to constitute a condenser of fixed capacity, a source of test voltage and means for impressing it upon said specimen including a bridge circuit one arm of which includes said specimen and the adjacent arm contains said fixed condenser, adjustable impedance devices mounted in said shell and connected in the other two arms of said bridge and means for operating them to balance the bridge, and means for compensating said bridge for errors resulting from an electrostatic charge on said specimen.

2. A device for measuring insulation qualities of a grounded specimen comprising a metallic casing, a shell of conducting material therein and spaced therefrom to constitute a condenser of fixed capacity, a source of test voltage and means for impressing it upon said specimen including a bridge circuit one arm of which includes said specimen and the adjacent arm contains said fixed condenser, adjustable impedance devices in the other two arms of said bridge and means for operating them to balance the bridge, and means for compensating said bridge for errors resulting from an electrostatic charge on said specimen comprising an impedance element of fixed value connected in additive relation to an impedance device in one of the said other two arms.

3. A device for measuring insulation qualities of a grounded specimen comprising a metallic casing, a sheet of conducting material therein and spaced therefrom to constitute a condenser of fixed capacity, a source of test voltage and means for impressing it upon said specimen including a bridge circuit one arm of which includes said specimen and the adjacent arm contains said fixed condenser, adjustable impedance devices in the other two arms of said bridge and means for operating them to balance the bridge, and means for compensating said bridge for errors resulting from an electrostatic charge on said specimen comprising an impedance element of fixed value connected in additive relation to an impedance device in one of the said other two arms, and means for switching said element out of said relation.

4. A device for measuring insulation qualities of a grounded specimen comprising a metallic casing, a shell of conducting material therein and spaced therefrom to constitute a condenser of fixed capacity, a source of test voltage and means for impressing it upon said specimen including a bridge circuit one arm of which includes said specimen and the adjacent arm contains said fixed condenser, adjustable resistors and condensers in the other two legs for balancing said bridge, and means for over-compensating said balancing means for errors resulting from an electrostatic charge on said specimen.

5. In a device for measuring the power-factor of a grounded insulation specimen comprising an inverted Schering bridge circuit, means for impressing a high-potential test voltage on one junction thereof, the opposite junction of which is to be grounded, a shielded test cable extending from an adjacent bridge junction, a shell of conducting material surrounding said bridge and electrically connected to the fourth terminal of said bridge, a grounded casing enclosing said shell constituting therewith a condenser of known value, and means for impressing said test voltage on the shield of said cable.

6. In a device for measuring the power-factor of a grounded insulation specimen comprising an inverted Schering bridge circuit, means for impressing a high-potential test voltage on one junction thereof, the opposite junction being grounded, a shielded test cable extending from an adjacent bridge junction, a shell of conducting material surrounding said bridge and electrically connected to the fourth terminal of said bridge, a grounded casing enclosing said shell constituting therewith a condenser of known value, and means for impressing said test voltage on the shield of said cable including an impedance device having a voltage drop approximating the drop of said bridge circuit.

7. In a device for measuring the insulation qualities of a test specimen comprising a bridge circuit, means for impressing a test voltage on one junction thereof, adjustable impedance devices in the arms of the bridge adjacent to said junction, a standard of comparison in a third arm of said bridge, means including a shielded cable for connecting a test specimen in the fourth arm of the bridge, the junction between said third and fourth arms being electrically connected to the source of said test voltage, and means for compensating said bridge for errors resulting from an electrostatic charge on the specimen.

THOMAS R. WATTS.
JAMES H. FRAKES.